Figure 1:
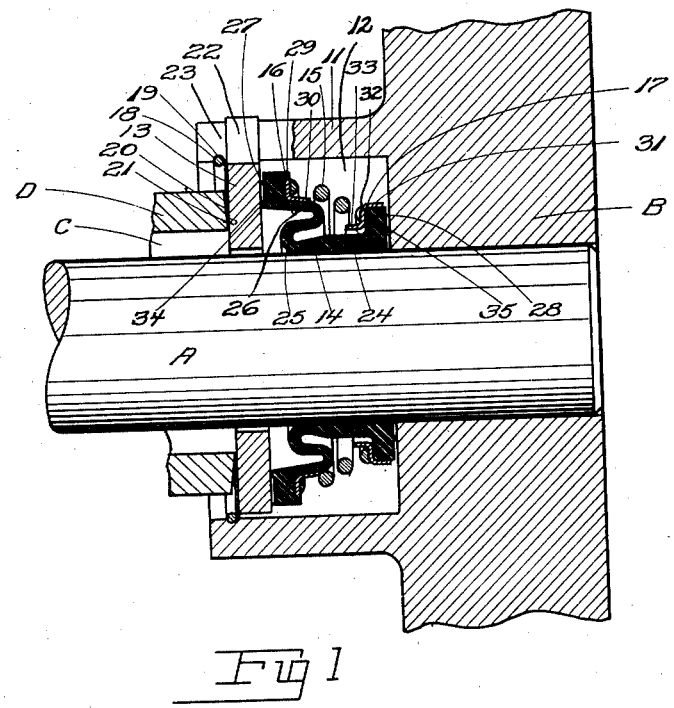

June 5, 1951  A. M. CHAMBERS, JR., ET AL  2,555,675

SEALING DEVICE

Filed May 31, 1947

INVENTORS:
Albert M. Chambers, Jr.
and George R. Milligan
BY
Fraser, Myers & Manley
ATTORNEYS.

Patented June 5, 1951

2,555,675

UNITED STATES PATENT OFFICE 2,555,675

SEALING DEVICE

Albert M. Chambers, Jr., and George R. Milligan, Palmyra, N. Y., assignors to The Garlock Packing Company, Palmyra, N. Y., a corporation of New York Application May 31, 1947, Serial No. 751,550

4 Claims. (Cl. 286—11)

The present invention relates to improvements in sealing devices for effecting a seal against the passage of fluid or of dust, dirt or other foreign matter, between relatively movable machine elements as, for example, between a rotating shaft and a machine casing within which the shaft is mounted. More particularly, the invention relates to sealing devices wherein the sealing means includes a flexible element such as a bellows or diaphragm which maintain an effective seal despite relative movement of the sealed machine elements axially, radially and angularly.

An important object of this invention is the provision of a sealing device which employs a flexible bellows, which is directly supported upon a shaft, but nevertheless permits relatively free axial, radial, and angular movement of a sealing or wear ring which is associated with the bellows.

Another object is the provision, in a sealing device, of a molded flexible bellows in which the convolutions thereof are in the plane of movement of mold elements employed for forming the bellows whereby to simplify the manufacture of the latter and minimize the cost thereof.

Another object is the provision of a sealing device having a bellows which is not materially stressed when in a mean operating position so that maximum operating deflection of the bellows in either of opposite directions will not materially strain the bellows.

Another object is the provision of a sealing device having a bellows which, during assembly or in use, undergoes a rolling action permitting substantial axial contraction and expansion thereof while not subjecting any section of the bellows to material internal distortion which might cause early failure of the device.

Another object is the provision of means at one end of a bellows-expanding spring for centering the latter and for enhancing the pre-loading effect of the corresponding end of the bellows upon a shaft while nevertheless avoiding excessive restraint upon expansion of said bellows at its mentioned end when it is pressed on to the shaft.

The foregoing and other objects and advantages are accomplished by the present invention, the features of which should be understandable from the following description and the accompanying drawing illustrating one of various possible embodiments of the invention and a variation of said embodiment.

Figure 2:
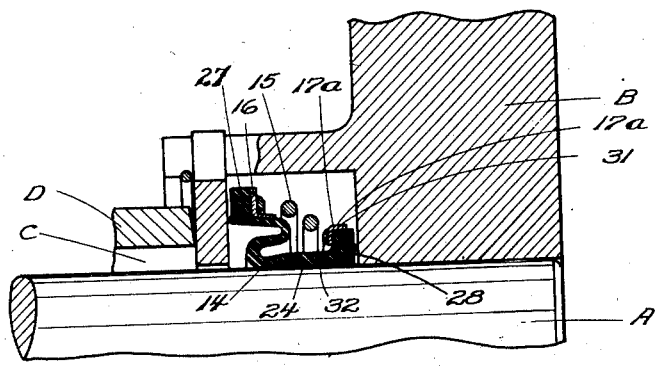

In the drawing:

Figure 1 is a central axial sectional view of a sealing device according to the present invention, in operative association with a portion of a pump casing and an impeller shaft extending through said casing; and Fig. 2 is a central, axial sectional view, similar to the upper half of Fig. 1, of a sealing device according to the present invention illustrating a variation of the embodiment shown in Fig. 1.

In Fig. 1, there is disclosed a portion of a structure such as a water pump at the point where an impeller shaft A, carrying an impeller B (of which only the hub portion is shown), extends through an annular opening C in a casing portion D.

The broad purpose of the present invention is to provide improved means for preventing fluid from passing from within the casing D, leftwardly along the shaft A and through the opening C to the exterior of the casing. The structure disclosed herein for accomplishing this purpose is associated with the shaft and impeller and is constrained to rotate therewith.

Referring to Fig. 1, the impeller hub B is provided with an integral cylindrical flange 11 forming an annular recess 12 for receiving therewithin a sealing or wear ring 13, a flexible, conical bellows 14, a conical coil spring 15 and spring-seating washers 16 and 17. All these parts within the recess 12 encircle the shaft A and are held against unintended dislodgment from said recess by a split snap ring 18 which is resiliently expanded into an inner annular groove 19 in the flange 11.

The sealing ring 13 preferably is in the form of a flat disc of suitable relatively rigid material of a character which will not become deformed under the physical forces to which it is subjected in use and which will rotate quite freely with its sealing face 20 in sealing engagement with an annular sealing surface 21 at the inner end of the casing portion D. Material such as Bakelite has been found to be suitable for the mentioned sealing ring.

As illustrated, the sealing surface 21 of the casing is slightly angular to the sealing face 20 of the sealing ring. By this arrangement the two said contacting sealing surfaces are of minimum area and, hence, only a minimum degree of friction loss is present at the mentioned sealing surfaces and any tendency of the casing and the sealing ring to stick at each starting of the pump is substantially obviated. In addition, the surface 21 tends to groove into the surface 20 concentrically to some extent in initial use, and because of such grooving the annular sealing areas of said surfaces tend to remain in axial alignment with each other even in the presence of wobble or misalignment of the shaft. Such wobble or misalignment, as hereinafter explained, is taken up in the bellows 14 where no wear is involved. The sealing ring 13 is provided with an integral radially extending tongue 22 which is axially slidable within an axial slot 23 in the flange 11 of the impeller. This constrains the sealing ring 13 to rotate with the impeller and the shaft.

The spring 15 is under compression with its large-diameter end seated upon the washer 16 and its small-diameter end seated upon the washer 17.

The bellows 14 preferably is molded substantially in the somewhat conical shape shown in the drawing, with a relatively thick-walled sleeve portion 24 merging at its outer end into an inner convolution 25 which turns radially outwardly and then back upon itself to some extent in a generally axially inward direction and merges with an outer convolution 26 which turns radially outwardly and then back upon itself to some extent in a generally axially outward direction. The bellows 14 also has a relatively thick, large-diameter radial flange 27 integral with the outer end of the convolution 26 and a relatively thick, small-diameter radial flange 28 integral with the inner end of the sleeve portion 24 of the bellows. The bellows preferably is formed of relatively soft flexible rubber or suitable synthetic rubber or other flexible rubber-like material (hereinafter referred to merely as "rubber" for convenience).

The washers 16 and 17 preferably are formed of brass or other suitable metal of sufficient thickness and rigidity as not to become deformed from a substantially perfect annulus shape in use. The washer 16 preferably is bonded to the flange 27 of the bellows 14, during the molding of the latter, with a radial flange 29 of the washer disposed against the right radial face of the flange 27 and an axial flange 30 of the washer overlying the outer end of the convolution 26. The washer 16, if bonded to the flange 27, serves to prevent inward shrinkage or other deformation of said flange which otherwise might occur after a period of service.

The washer 17 preferably has an outer cylindrical flange 31 snugly overlying the periphery of the flange 28 of the bellows and a radial flange 32 which forms a seat for the small-diameter end of the spring and is disposed against the left radial face of the flange 28.

The large diameter end of the spring 15 seats within the angle formed by the flanges 29 and 30 thereby centering that end of the spring relatively to the bellows. The described rigid structure of the washers 16 and 17 and the bonding of washer 16 to the flange 27 of the bellows assures that the expansive force of the spring is applied to the flanges 27 and 28 substantially uniformly about their circumferences.

The washer 17 illustrated in Fig. 1 also has an inner cylindrical flange 33 spaced somewhat from the outer surface of the sleeve portion 24 of the bellows. This flange serves to center the small-diameter end of the spring 15 with respect to the flange 28 of the bellows. Thus in that illustrated structure the spring is positively centered at both ends.

Annular ridges 34 and 35 preferably are provided respectively at the left or outer face of the flange 27 and at the right or inner face of the flange 28 of the bellows. In order to show these ridges clearly, the mentioned flange faces are shown in the drawings as though slightly spaced from the adjacent radial faces of the sealing ring 13 and the impeller B. Actually, however, due to the flexibility of the bellows, practically the entire areas of the mentioned flange faces are in engagement with the adjacent sealing ring and impeller faces, with the ridges 34 and 35 serving to accentuate the sealing engagement of the bellows with the sealing ring and the impeller about relatively narrow annular areas when the device is in use.

The structure illustrated in Fig. 2 differs from that of Fig. 1 only in that the washer 17a, corresponding to washer 17 of Fig. 1, has no flange corresponding to flange 33 shown in the latter figure. Thus the spring 15 in Fig. 2 is only positively centered at its large-diameter end. Although in this respect the structure of Fig. 1 is preferred over that of Fig. 2, the latter structure is satisfactory for use under conditions ordinarily encountered.

It may be observed that the washers 17 and 17a in the two illustrated embodiments enhance the gripping engagement of the bellows 14 with the shaft A by limiting the radial expansion of the small-diameter flange 28 of the bellows when the latter is pressed onto a shaft having a somewhat greater diameter than the internal diameter of the bellows. By imposing this radial-expansion limitation upon the flange 28 which is of relatively substantial radial sectional diameter and capable of substantial axial deformation, a sealing device of a particular internal diameter may be used with shafts of more various diameters than if the inner periphery of the washer 17 or 17a imposed radial-expansion limitation upon the sleeve portion 24 which is of smaller radial sectional diameter than the flange 28. In this connection it should be observed that the inner cylindrical flange 33 of the washer 17 and the inner edge of the radial flange 32 of the washer 17a are radially spaced to a material extent from the adjacent outer surface of the sleeve portion 24 of the bellows so that neither of these washers restricts the said sleeve portion against radial expansion when the sealing device is forced upon the shaft.

The conical shape of the bellows 14 wherein the wall progresses from the small flange 28 through the convolutions 25, 26 to the larger flange 27, affords a compact sealing bellows which readily flexes axially to adjust its length in accordance with axial relative movements of the shaft A and the casing portion D in operation, or flexes slightly angularly to provide compensation in the bellows for wobbling or misalignment of the shaft. The effect of such length variations on the bellows is substantially localized in the convolutions 25, 26 which merely roll slightly in their illustrated telescoping relationship without setting up any substantial harmful internal stresses in the material forming said convolutions. Thus, the bellows yield highly satisfactory service and seldom require replacement. In their illustrated telescoping arrangement, the convolutions function adequately to maintain the concentricity of the flange 27 of the bellows, while nevertheless permitting the mentioned flexing of the bellows.

The bellows preferably is molded substantially to its shape as shown in the drawings, so that in normal operation it is in substantially unflexed condition. The resiliency of the bellows is not relied upon to urge its flanges 27 and 28 apart as that function is effectively performed by the spring 15.

The compressive force of the spring 15 preferably is sufficiently great and the convolutions 25, 26 of the bellows sufficiently flexible, that the sealing relationship of the bellows flange 27, the sealing ring 13 and the casing portion D is not disturbed even though wobble or misalignment of the shaft might occur repeatedly and at relatively rapid frequency in operation.

It is noteworthy also that the bellows 14 is shaped so that the side walls of the convolutions 25 and 26 extend substantially coaxially of the device or, i. e., in substantial parallelism to the line of movement of a mold element. Such a shape can be molded in a simple mold which does not require the use of loose inserts or split mold plates and assures substantial uniformity of wall thicknesses of bellows formed therein.

It should be apparent that the present inventive concept could be employed in various ways other than as illustrated and described herein without, however, departing from the spirit of the invention as set forth in the accompanying claims.

What we claim is:

1. A sealing device bellows comprising opposite annular extremity portions of different over-all radial diameters and a flexible, annular web integrally connecting said portions, the said web when the device is in operation being substantially S-shaped in axial section and being flexible, in operation, substantially throughout the S and having the top and bottom of the S in substantially radial alignment with the said top of the S in substantial axial alignment with one of said extremity portions and the said bottom of the S in substantial axial alignment with the other of said extremities, the convolutions of the S being open whereby to obviate friction between portions of the said web during relative axial movement of such web portions, further including a cylindrical portion adjoining the said smaller-diameter extremity portion, the said cylindrical portion being of greater radial thickness than the thickness of the material of the S-shaped web.

2. A sealing device comprising a flexible sleeve having radial flanges toward opposite ends thereof, of different outer radial diameters, and a web flexibly interconnecting said flanges and having portions which inter-telescope, and are spaced radially of each other so as to be free of frictional inter-engagement, and a conical coil spring surrounding said sleeve and coacting at its small end with the said smaller-diameter flange of the sleeve and at its large end with the said larger-diameter flange of the sleeve to urge the said flanges away from each other to extend said sleeve axially; the said radial flanges of the flexible sleeve being relatively rigid as compared to said web and having opposed, substantially parallel radial faces; the opposite ends of said spring being held in contact with said parallel surfaces by an expansive force established in the spring by axial compression thereof; and the rigidity of said radial flanges being sufficient to maintain them against material deformation resulting from the spring's expansive force, whereby to maintain the flexible sleeve and spring as a unitary assembly.

3. A sealing device comprising a flexible annular sealing element having outwardly extending radial flanges at oppostie ends with substantially parallel, inner, opposed, radial faces, and outer radial faces suitable for effecting sealing engagement with radial faces of adjacent elements, and a coil spring encircling said sealing element and compressed between the inner radial faces of said flanges to urge the two said flanges toward opposite directions with the two ends of the spring disposed within the radial limits of the said flanges; the said sealing element having an intermediate portion between said flanges including a first substantially cylindrical sleeve directly integral with one of the two flanges at one end of the device, a second substantially cylindrical sleeve, directly integral with the other of the flanges at the other end of the device and an annular web interconnecting the said sleeves at their ends remote from their said respective integral flanges; the said web and adjoining annular marginal portions of the said sleeves being flexible and the inside diameter of the said marginal portion of one sleeve being greater than the outside diameter of the said marginal portion of the other said sleeve whereby to permit relative axial movement of said sleeves in which the said marginal portions of the two sleeves move along different concentric paths.

4. A sealing device comprising a flexible annular sealing element having outwardly extending radial flanges at opposite ends with substantially parallel, inner, opposed, radial faces, and outer radial faces suitable for effecting sealing engagement with radial faces of adjacent elements, and a coil spring encircling said sealing element and compressed between the inner radial faces of said flanges to urge the two said flanges toward opposite directions with the two ends of the spring disposed within the radial limits of the said flanges; the said sealing element having an intermediate portion between said flanges including a first substantially cylindrical sleeve, directly integral with one of the flanges at one end of the device, a second substantially cylindrical sleeve, directly integral with the other of the flanges at the other end of the device and having a greater inside diameter than the outside diameter of said first sleeve, and an annular web interconnecting said sleeves at their ends remote from their said respective integral flanges; the said web and adjoining annular marginal portions of the said sleeves being flexible and the mentioned difference in the diameters of said sleeves and the flexibility of said web and the mentioned annular marginal portions of said sleeves permitting relative axial movement of said sleeves along different concentric paths accompanied by rolling movement of said flexible annular portions about circular axis lines; the said first sleeve and its said integral flange having similar inside diameters and being adapted to fit snugly about a shaft extending therethrough.

ALBERT M. CHAMBERS, Jr.
GEORGE R. MILLIGAN.

REFERENCES CITED

The following references are of record in the file of this patent:

UNITED STATES PATENTS

| Number | Name | Date |
|---|---|---|
| 821,926 | Cornish | May 29, 1906 |
| 2,027,505 | Winkler | Jan. 14, 1936 |
| 2,230,510 | Lignian et al. | Feb. 4, 1941 |
| 2,289,274 | Krug | July 7, 1942 |
| 2,299,638 | Marvin | Oct. 20, 1942 |

FOREIGN PATENTS

| Number | Country | Date |
|---|---|---|
| 574,619 | Great Britain | Jan. 14, 1946 |